United States Patent [19]

Nakamura et al.

[11] Patent Number: 4,683,176
[45] Date of Patent: Jul. 28, 1987

[54] OPTICAL MAGNETIC RECORDING MEMBER

[75] Inventors: Kyuzo Nakamura; Yoshifumi Ota; Tsutomu Asaka, all of Yachimatamachi, Japan

[73] Assignee: Nihonshinku Gijutsu Kabushiki Kaisha, Kanagawa, Japan

[21] Appl. No.: 641,119

[22] Filed: Aug. 15, 1984

[30] Foreign Application Priority Data

Aug. 15, 1983 [JP] Japan .................. 58-148038

[51] Int. Cl.[4] .............................................. G11B 7/24
[52] U.S. Cl. ..................... 428/692; 428/694; 428/702; 428/900
[58] Field of Search ........... 428/692, 694, 900, 702; 360/131, 135; 365/122; 369/13, 288

[56] References Cited

U.S. PATENT DOCUMENTS

| | | | |
|---|---|---|---|
| 3,928,870 | 12/1975 | Ahrenkiel et al. | 360/131 |
| 4,277,809 | 7/1981 | Fisher et al. | 428/900 |
| 4,405,677 | 9/1983 | Chen | 428/900 |
| 4,489,139 | 12/1984 | Ohta et al. | 428/694 |

FOREIGN PATENT DOCUMENTS

| | | | |
|---|---|---|---|
| 2558937 | 8/1976 | Fed. Rep. of Germany | 252/62.55 |
| 146207 | of 1981 | Japan . | |
| 60745 | 4/1984 | Japan | 360/131 |
| 2071696 | 9/1981 | United Kingdom . | |
| 589627 | 1/1978 | U.S.S.R. . | |

OTHER PUBLICATIONS

Herd; J. Applied Phys. 49(3), Mar. 1978, p. 1744.
Cargill et al.; J. Appl. Phys. 49(3), Mar. 1978, p. 1753.
Almasi et al.; IBM TDB, vol. 14(1), Jun. 1971, p. 342.
Stoffel; IBM TDB, vol. 12(1) Jun. 1969, p. 209.
Cohen et al.; RCA Review, vol. 33, Mar. 1972, pp. 54–70.
Schneider et al.; J. Appl. Phys. 49(3), Mar. 1978, p. 1747.

Primary Examiner—George F. Lesmes
Assistant Examiner—William M. Atkinson
Attorney, Agent, or Firm—Armstrong, Nikaido, Marmelstein & Kubovcik

[57] ABSTRACT

An optical magnetic recording member comprising a perpendicular-type magnetic film which is provided on a reflection film, and is made of a mixture of a ferromagnetic metal Me and a dielectric material.

8 Claims, 5 Drawing Figures

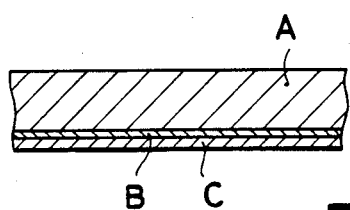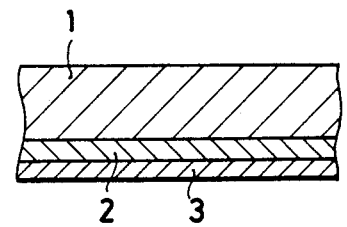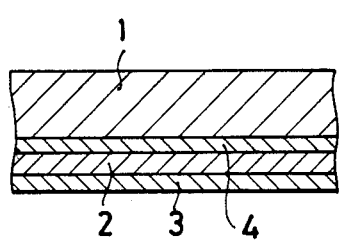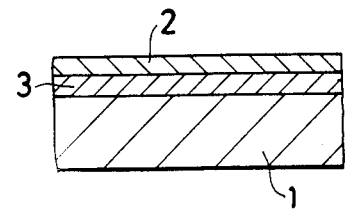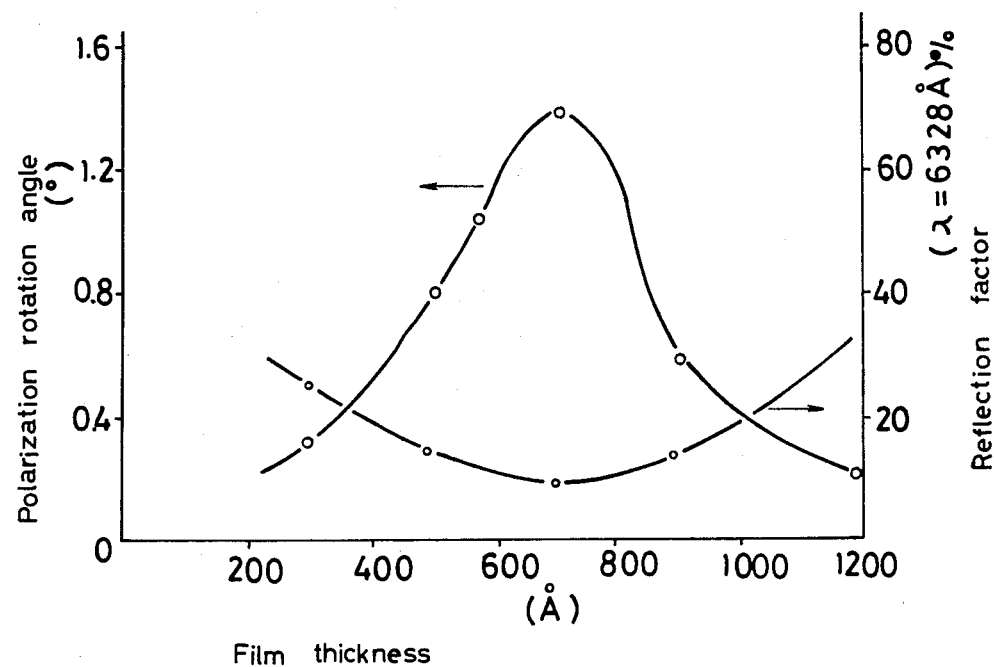

OPTICAL MAGNETIC RECORDING MEMBER

BACKGROUND OF THE INVENTION

This invention relates to an optical magnetic recording member.

Recently, a new optical magnetic recording system capable of high density recording has been noted and studied. The medium used for this recording system is a thin film of MnBi or an amorphous thin film of a rare earth element- Fe, Co. This thin film must have the following two properties. First, it must be a perpendicular-type magnetic film which has a strong magnetic anisotropy in the direction of the film thickness. A perpendicular-type film as used herein is one in which the magnetic particles deposited on the film base are perpendicular to that base. Second, this film must have a large polarization rotation angle. A drawback in the thin film of the prior art recording medium is that it does not have a sufficiently large Kerr rotation angle. Thus, it is difficult to use in practice.

As a means for improving the Kerr rotation angle associated with the thin film, it has been proposed, as shown in FIG. 1, that a perpendicular-type magnetic film (B) of MnBi or TbFe of 50-200 Å A in thickness, formed on a transparent substrate (A), be backed with a reflection film (C) made of Al or Cu or the like.

This new type of thin film is characterized by a larger polarization rotation angle which is the combination of a Kerr rotation with a Faraday rotation. The Kerr rotation occurs when the polarization plane is rotated when a laser ray is reflected at the front surface of the perpendicular magnetic film. The Faraday rotation occurs when the polarization plane is rotated when a laser ray penetrates the perpendicular magnetic film, is reflected at the reflection film, and transmitted back through the perpendicular magnetic film. The Faraday rotation is proportional to the transmitting distance, specifically, twice the film thickness.

One would expect that the polarization rotation angle would increase if the thickness of the perpendicular-type magnetic film is increased. However, the conventional perpendicular-type magnetic film made of a metallic film of MnBi or TbFe is characterized by large optical absorption and reflection and it is not possible to produce a film having sufficient thickness. Additionally, the faraday rotation angle (as well as the Kerr rotation angle) is essentially proportional to the saturated magnetization of the magnetic member. Thus, it is desirable that the perpendicular-type magnetic film have a large transmission factor and have high saturated magnetization.

DESCRIPTION OF THE INVENTION

From the foregoing viewpoint, the inventors of this application have provided a new type of optical magnetic recording member which is characterized by a high polarization rotation angle. The recording member comprises a mixture-type composite, perpendicular-type magnetic film made of a mixture of a ferromagnetic metal (Me) and a dielectric material.

This composite perpendicular-type magnetic film can be formed by a vapor deposition process, an ion plating process, a sputtering process or other similar methods. It contains a mixture of columnar particles of a ferromagnetic metal such as Fe, Co, or Ni or an alloy thereof, and particles of a dielectric material which is an oxide of a ferromagnetic metal. The dielectric material can also be particles of $SiO_2$, $Al_2O_3$, $Cr_2O_3$, $TiO_2$, $ZrO_2$ $MgF_2$ or similar oxides and flourides.

The reflection film is made of Al, Cu, Ag, Au, Pt or similar metals by vapor deposition, a sputter method or other similar methods.

FIG. 2 shows one embodying example of this invention, wherein numeral 1 denotes a transparent substrate of any desired shape made of glass, an acrylic synthetic resin or similar meterial. Numeral 2 denotes a composite perpendicular-type magnetic film which is 100-10,000 Å, (Preferably 200-5000 Å) in film thickness, and preferably has an optical transmissive property and preferably has an optical transmission factor of above 10%. This perpendiculartype magnetic film is made of a two-phase mixture comprising evaporated atoms of Fe, Co, Ni or an alloy thereof, and a dielectric material which is an oxide formed when some of the evaporated atoms of Fe, Co or Ni are oxidized by oxygen. Numeral 3 denotes a reflection film which is provided on the rear surface of the perpendicular-type magnetic film 2, has a thickness of above 1000 Å, and is made of a metallic vapor deposition film of Al, Cu or another nonmagnetic metal.

FIG. 3 shows a modified example of the recording member of this invention, wherein a transparent insulation layer 4 is interposed between the transparent substrate 1 and the composite perpendicular-type magnetic film 2, such insulation serving to reduce damage caused by thermal conduction produced when thermal magnetic recording is carried out by laser irradiation.

If, instead of the non-magnetic metallic material, a comparatively soft magnetic material such as Fe, Co or permalloy is used for the reflection film 3, the polarization rotation angle is increased for two reasons. First, the soft magnetic reflection film 3 is magnetized by a magnetic field generated from the perpendicular-type magnetized film 2, the magnetic vector at the boundary surface being nearly perpendicular thereto. Thus, when the laser ray is reflected at that surface, a Kerr rotation occurs. The other reason is that the reflection film made of soft magnetic material prevents a magnetic flux from leaking in the form of a horseshoe, so that the diamagnetic field applied to the perpendicular-type magnetic film 2 is decreased, and consequently the magnetic vector of the perpendicular magnetic film is closer to a perpendicular-type line, and both the Faraday rotation and the Kerr rotation are increased. This advantage is due to the fact that these two kinds of rotation are maximum when the magnetic vector is perpendicular.

Further, if a perpendicular magnetic film of Co—Cr, Tb—Fe or the like is used for the reflection film 3, the magnetic vector at the boundary surface of the reflection film becomes closer to a perpendicular line, so that the polarization rotation angle becomes larger.

When the optical magnetic recording member of this invention is used for thermal magnetic recording, the recording is carried out in such a manner that both the mixture-type perpendicular magnetic film 2 and the perpendicular magnetic film of the reflection film 3 are heated by a laser ray.

A number of processes for forming the foregoing composite perpendicular-type magnetic film 2, can be used. In one such process, evaporated atoms or sputtered atoms of a ferromagnetic metal (Me) are adhered to the transparent substrate while being partly oxidized by oxygen gas introduced into a vacuum treatment container. In another process, a ferromagnetic metal (Me) and a dielectric material (such as $SiO_2$) are simultaneously sputtered and become simultaneously adhered to the substrate surface.

The relationship between the thickness of the composite perpendicular-type magnetic film, and the polarization rotation angle obtained when a laser ray used for reproducing is reflected was examined on various recording members of this invention in which the composite perpendicular-type magnetic films were varied. It was found that if the thickness of the magnetic film was minimized, the polarization rotation angle increased greatly. This is because the Faraday rotation is enhanced by an interference effect of the semi-transparent perpendicular-type magnetic film 2 itself.

The optical magnetic recording member of this invention is usually a system comprising a transparent substrate 1 which is provided on a composite perpendicular-type magnetic film 2. Recording and reproducing are carried out by a laser ray irradiated from the side of the transparent substrate 1. Accordingly, in order for the interference effect between the laser ray and the composite perpendicular-type magnetic film to be such that the reflectance from the latter is minimized, it is essential that the refractive index of the composite perpendicular-type magnetic film be larger than the refractive index of the transparent substrate 1. In the case where the transparent substrate 1 is a glass substrate or an acrylic resin substrate with a refractive index of about 1.5, the dielectric material contained in the composite perpendicular-type magnetic film 2 must have a refractive index of above 1.5. The film thickness needed for making the reflectance minimum depends on the refractive indexes of the transparent substrate and of the composite perpendicular-type magnetic film, so that the film thickness should be determined based upon the combination of materials used for the transparent substrate and the perpendicular-type magnetic film.

BRIEF DESCRIPTION OF THE DRAWINGS:

FIG. 1 is a sectional view of part of a conventional optical magnetic recording member.

FIG. 2 is a sectional view of part of a recording member embodying this invention.

FIG. 3 is a sectional view of part of another recording member of this invention.

FIG. 4 is a diagram showing the relationship between the film thickness of a semi-transparent perpendicular-type magnetic film, the reflection factor, and the polarization rotation angle.

FIG. 5 is a sectional view of part of another recording member of this invention.

The present invention can be illustrated by reference to the following non-limiting experimental examples:

The samples use glass plates as transparent substrates. Ferromagnetic metals are subjected to a vapor deposition process in a vacuum treatment container while oxygen gas is introduced thereinto so that composite perpendicular-type magnetic films of different thicknesses are obtained. Then various kinds of reflection films are formed on the respective magnetic films. For measuring the respective polarization rotation angles, each of these samples is placed in an electromagnet and is subjected to an electric field for magnetization. The change in the polarization rotation angle in the course of magnetization is measured to obtain values for the polarization rotation angles corresponding to saturated magnetization. The measurement is taken from the side of the glass substrate. The laser ray used is the 6328 Å wavelength of a He-Ne laser.

The results show that in instances where the composite perpendicular-type magnetic film is not backed by a reflection film, the rotation angle is very small. The samples which illustrate this invention show remarkably large rotation angles, as compared with samples which do not contain a reflection film, and additionally with a conventional example. The polarization rotation angle depends on the material constituting the reflection film. Reflection films made of Co-Cr, or Fe-Tb cause greater polarization rotation than do films made of soft metallic magnetic materials, which in turn cause greater polarization rotation than films made of non-magnetic materials.

Additionally, various samples of different film thicknesses, each having a reflection film of Al and a composite perpendicular-type magnetic film of $Co_{0.60}$—$O_{0.40}$ composition were prepared. The polarization rotation angle was measured for each of these samples to examine the relationship between the film thickness and the rotation angle. The results obtained are shown in FIG. 4. They show that the rotation angle changes with the film thickness, and that the reflectance is minimized (and the polarization rotation angle is maximized) at a film thickness of 600–800 Å. An almost identical effect is shown when other materials are used for the reflection film.

FIG. 5 shows a modified embodiment of this invention. The substrate 1 may be either transparent or non-transparent and is provided on the reflection film 3 (as opposed to being provided on the perpendicular-type magnetic film).

What is claimed is:

1. An optical magnetic recording member comprising:
    (a) a composite semi-transparent perpendicular-type magnetic film made of a mixture of a ferromagnetic material and a dielectric material;
    (b) a reflection film formed on the perpendicular-type magnetic film; and
    (c) a transparent substrate for supporting said magnetic film and said reflection film,
   wherein the refractive index of the composite semi-transparent perpendicular-type magnetic film is larger than the refractive index of the transparent substrate, wherein the reflection film is made of a soft magnetic material or a metallic perpendicular-type magnetic film selected from the group consisting of Co—Cr and Tb—Fe.

2. An optical magnetic recording member as claimed in claim 1, wherein the substrate is adjacent to the composite semi-transparent perpendicular-type magnetic film.

3. An optical magnetic recording member as claimed in claim 1, wherein the ferromagnetic metal is selected from the group consisting of Fe, Co, Ni and their alloys, and the dielectric material is selected from the group consisting of oxides of Co, Fe, Ni, Al, Ti, Zr, Si, and fluorides of Mg.

4. An optical magnetic recording member as claimed in claim 1, wherein the reflection film is made of a soft magnetic material.

5. An optical magnetic recording member as claimed in claim 1, wherein the reflection film is a metallic perpendicular-type magnetic film selected from the group consisting of Co—Cr, and Tb—Fe.

6. An optical magnetic recording member as claimed in claim 1, wherein the composite semi-transparent perpendicular-type magnetic film is of such a film thickness to minimize the reflection factor of said optical magnetic recording member at any given reproducing laser wavelength.

7. An optical magnetic recording member as claimed in claim 1, wherein a transparent insulation material film is interposed between the transparent substrate and the composite semi-transparent perpendicular-type magnetic film.

8. An optical magnetic recording member as claimed in claim 7, wherein the transparent insulation material film is made of $SiO_2$.

* * * * *